United States Patent [19]

Barritt

[11] Patent Number: 5,050,432

[45] Date of Patent: Sep. 24, 1991

[54] TANK GAUGE

[76] Inventor: Brian Barritt, 15 McCullough Crescent, Red Deer, Alberta, Canada, T4R 1S4

[21] Appl. No.: 429,994

[22] Filed: Nov. 1, 1989

[51] Int. Cl.⁵ .................. G01F 23/40; G01F 23/56
[52] U.S. Cl. ........................... 73/309; 73/321; 116/228
[58] Field of Search ............... 73/309, 321; 116/228

[56] References Cited

U.S. PATENT DOCUMENTS

| | | | |
|---|---|---|---|
| 354,508 | 12/1886 | Fraleigh | 73/321 |
| 572,321 | 12/1896 | Van Vleck | 116/228 |
| 728,512 | 5/1903 | Stanley | 73/321 |
| 872,753 | 12/1907 | Runyon | 73/321 |
| 1,208,026 | 12/1916 | Smith | 73/313 |
| 1,656,705 | 1/1928 | Gould | 116/299 |
| 1,933,522 | 10/1933 | Edwards | 116/228 |
| 2,216,035 | 9/1940 | Lang | 73/313 |
| 2,874,574 | 2/1959 | Patureau | 73/321 |
| 2,949,777 | 8/1960 | Ferron | 73/321 |
| 2,972,252 | 2/1961 | Quist | 73/321 |
| 3,090,232 | 5/1963 | Mayes | 73/321 |
| 3,500,546 | 3/1970 | Pilcher | 33/715 |
| 4,369,044 | 1/1983 | Heisterberg | 116/228 |
| 4,459,584 | 7/1984 | Clarkson | 73/321 |

FOREIGN PATENT DOCUMENTS

| | | | |
|---|---|---|---|
| 1339998 | 9/1963 | France | 73/321 |
| 1410445 | 8/1965 | France | 73/321 |
| 712675 | 1/1980 | U.S.S.R. | 73/309 |

Primary Examiner—William A. Cuchlinski, Jr.
Assistant Examiner—Diego F. F. Gutierrez
Attorney, Agent, or Firm—Swabey Ogilvy Renault

[57] ABSTRACT

A tank gauge for oil tanks wherein a double pulley is provided on a common shaft with the shaft being journaled in the wall of a sealed housing which is in communication with the interior of the tank. One of the pulleys is within the sealed housing on the shaft while the other pulley is outside of the housing fixed to the same shaft. A float on a suspension cable extends downwardly from the pulley in the sealed housing while a weighted indicator on the other pulley extends downwardly along the outside wall surface of the tank. The pulley within the housing and the cable thereon is kept sealed from the atmosphere while the other pulley and the indicator cable are in the open atmosphere on the exterior of the tank.

2 Claims, 1 Drawing Sheet

U.S. Patent  Sep. 24, 1991  5,050,432

TANK GAUGE

BACKGROUND OF THE INVENTION

Field of the Invention

The present invention relates to a tank gauge and more particularly a sealed tank gauge for use in measuring the level of liquids.

It is well known that a tank gauge in relation to an oil tank must be sealed in order to prevent gases such as hydrogen sulfide gases from escaping the tank. For this reason, many tank gauges have been developed which are properly sealed and explosion proof but which render the reading of such gauges difficult. Tank gauges such as described in U.S. Pat. No. 1,656,705 Gould, Jan. 17, 1928; U.S. Pat. No. 1,933,522, Edwards, Oct. 31, 1933; U.S. Pat. No. 2,216,035, Lang, Sept. 24, 1940 and U.S. Pat. No. 3,500,546, Pilcher, Mar. 17, 1970 provide methods of indirectly measuring the liquid level in a tank by telemetric systems, such as described in all of the patents with the exception of Lang. It is important as mentioned above, to keep the float and suspension cable system used for measuring the level of oil in a sealed, explosion-proof housing which communicates with the tank. However, in these systems, both the counterweight and the pulleys on which they are mounted are within the tank and/or the housing for the pulleys. In the Lang patent, a complicated system is provided wherein the counterweight is in the form of an indicator giving a direct reading of the level of oil in the tank. However, in Lang, the cable of the indicator on the outside of the housing must be kept in a completely sealed pipe and housing system as shown in FIG. 1 of the Lang Patent.

SUMMARY OF THE INVENTION

It is an aim of the present invention to provide simple liquid level float system and exterior indicator which can be read on the exterior of the tank without the complicated telemetering system or sealed housing shown in the prior art.

It is a further aim of the present invention to provide a simple float and pulley system for measuring the level of oil in a tank while maintaining the float and related suspension cable in a sealed explosion-proof housing and the indicator on its suspension cable, open to the atmosphere and on the exterior of the tank.

The construction in accordance with the present invention comprises a first sealed housing adapted to be sealingly mounted on roof of a liquid containing upstanding cylindrical tank, the housing having at least a first vertical planar wall, and aperture means communicating the first housing with the interior of the tank. A pulley shaft is journaled at least in the first planar wall and extends into the first housing and exteriorly thereof. Seal means engage the pulley shaft at the first vertical planar wall. A first pulley is fixedly mounted to the pulley shaft in the first housing and a second pulley is fixedly mounted on the pulley shaft exteriorly of the first housing whereby the torque provided by one pulley is directly transmitted to the other pulley. A first suspension cable is wound on the first pulley and passes through the aperture means into the tank and a float member has a predetermined weight and a buoyancy sufficient to float on the liquid in the tank provided at the end of the suspension cable in the tank. A second suspension cable is wound on the second pulley and is suspended exteriorly of the tank parallel to the tank wall. A weighted indicator is provided on the second cable wherein the weight is less than the weight of the float but sufficient to act as a counterweight on the system and to maintain the first and second suspension cable taut.

In a more specific embodiment of the present invention, there is provided a second housing mounted to the first housing adjacent the first vertical planar wall of the first housing and wherein the second housing can be open to the atmosphere.

In a further more specific embodiment of the present invention the indicator on the second suspension cable travels along a vertical axis adjacent and exteriorly of the cylindrical wall of the tank and scale markings are provided on the exterior wall thereof.

In another aspect of the present invention, there is provided a liquid containing tank having a fixed roof defining a sealed chamber and having at least a vertical wall portion. A shaft extends through the vertical wall portion and is journaled therein in a sealed manner such that a portion of the shaft extends within the chamber and another portion thereof extends exteriorly of the tank. A first pulley is fixedly mounted within the chamber on the shaft and a second pulley is fixedly mounted on the shaft exteriorly of the tank. Seal means engage the pulley shaft at the journal of the pulley shaft and the wall. A first suspension cable is wound on the first pulley and extends downwardly in the tank and a floating member having a predetermined weight and a buoyancy sufficient to float on the liquid in the tank is provided at the end of the suspension cable. A second suspension cable is wound on the second pulley and is suspended exteriorly of the tank parallel to the tank walls and an indicator is provided on the second cable wherein the weight of the indicator is less than the weight of the float but sufficient to act as a counterweight on the system and to maintain the first and second suspension cables taut.

When the term "cable" is used in this specification it includes metal or fibre braided cables, ropes, cords, wires, etc.

The invention will be better understood by an examination of the following description, together with the accompanying drawings, in which.

Figure 1:
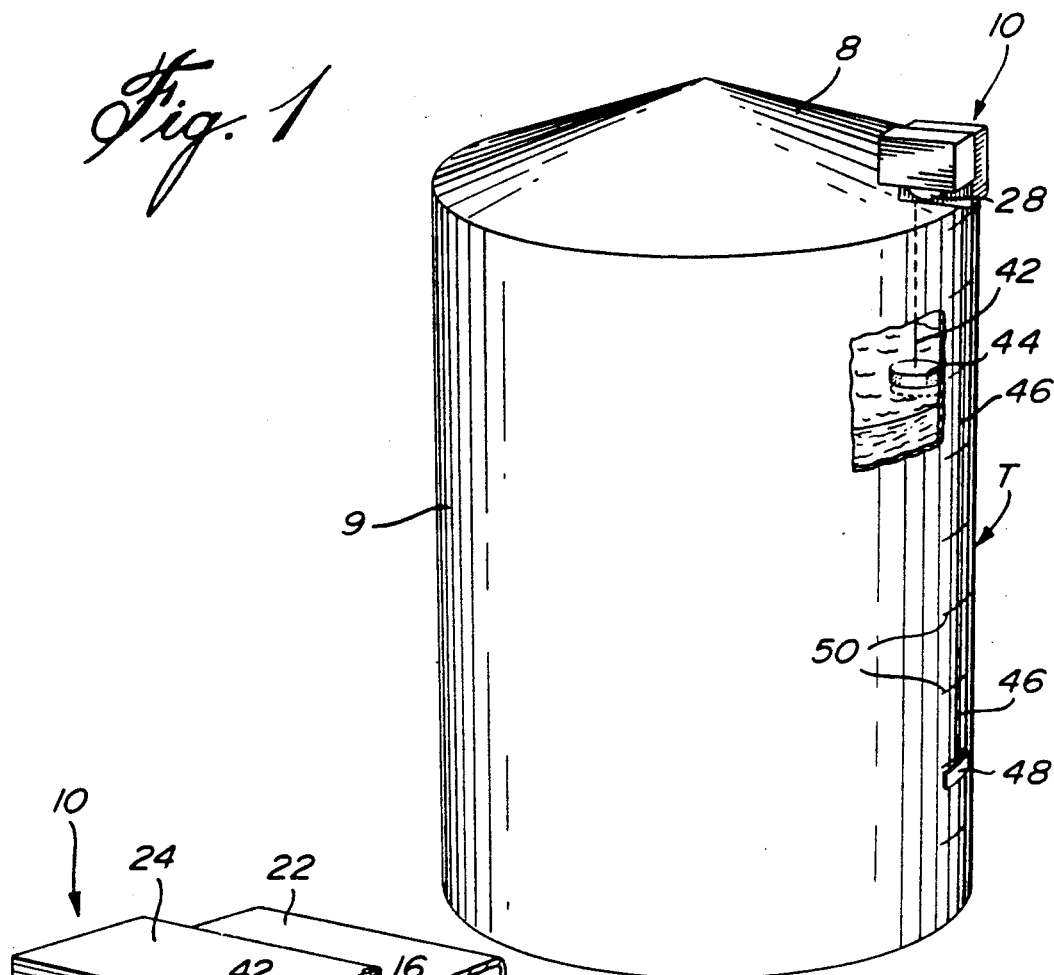
FIG. 1 is a perspective view of a typical oil tank on which is mounted an embodiment of the present invention.
Figure 2:
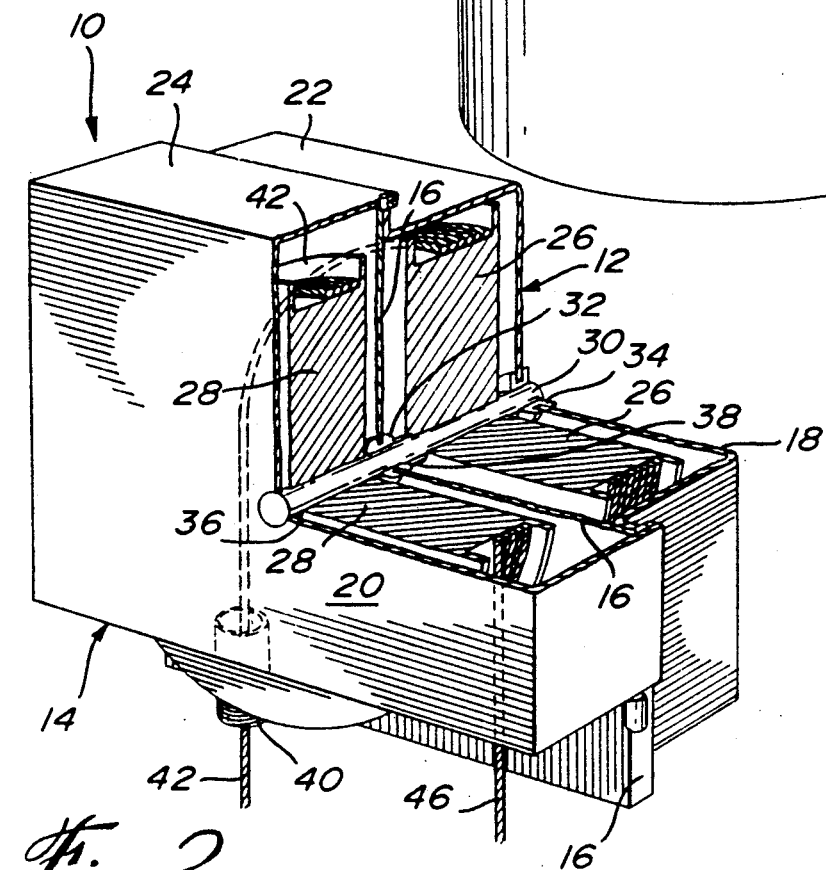
FIG. 2 is an enlarged fragmentary perspective view partly in cross section of the measurement device of the present invention.

DESCRIPTION OF PREFERRED EMBODIMENTS:

In the drawings, particularly FIG. 1, a tank T is illustrated, having an upstanding cylindrical tank wall 9 and a fixed roof 8. An embodiment of the tank gauge of the present invention is identified by the numeral 10 in FIG. 1 and shown in detail in FIG. 2.

A first sealed housing 12 is provided which is adapted to be mounted on the flange on the roof 8 of the tank T. A dust cover or second housing 14 is mounted adjacent the first housing 12 and is in fact attached to wall 16 which serves as a median wall between housing 12 and housing 14. Median wall 16 forms one side of the sealed housing 12 while the other side is closed off by wall 18. A top wall 22 extends above and around the parallel walls 16 and 18. A bottom wall (not shown) closes off the housing 12 in order to provide a sealed housing. The second housing 14 is also provided with an outer wall 20 and a top wall 24.

A first pulley 26 is provided in the sealed housing 12 on a shaft 30. The shaft 30 which can be of stainless steel extends through the median wall 16 in a bearing 32 with a seal 38. The shaft 30 extends through the second housing 14 and is journaled in bearing 36 on the outer wall 20. The shaft 30 is also journaled in outer wall 18 by means of the sealed bearing 34.

Pulley 28 is mounted on shaft 30 within the housing 14. Each pulley is approximately of 8 inches in diameter with a groove which is 2 inches wide and having a depth of 1 inch. A suspension cable 42 is fixed at one end to the drum of pulley 26 and is wound about the groove in the pulley 26 and passes down through a nipple 40 in the bottom wall of housing 12, through the roof 8 of the tank T.

The suspension cable 42 has at the other end, a float 44, which is adapted to float on the oil surface within the tank T as shown in FIG. 1. The sealed housing 12 is in communication with the interior of the tank T and is sealed therewith to prevent any gases from being emitted from the housing 12.

Pulley 28 is fixed to the shaft 30 and has a similar dimension to pulley 26. A cable 46 is fixed to the drum of pulley 28 and is wound on the drum in the direction opposite to the direction of the cable 42 on pulley 26. The cable 46 extends downwardly from the pulley 28 on the exterior of the tank T and preferably parallel with and along the tank wall 9. As shown in FIG. 1, an indicator 48 is provided at the other end of the cable 46 and is calibrated with scale marks 50 on the wall of the tank T.

The weight 48 is selected to be lighter than the weight of the float 44. In the present case, the weight of the indicator 48 is 9 pounds, while the float weighs 13 pounds. The float 44 is of course chosen to be buoyant on the liquid which is within the tank. A differential of weight between the indicator and the float must be maintained although such differential may be less than that selected herein, in order that the cable system of the two pulleys be kept taut.

Both pulleys 26 and 28 are of course fixed to shaft 30 and thus the torque transmitted by the pulley 26 through the shaft 30 is responded to directly by the pulley 28.

In this manner, a direct indication of the level of the liquid within the tank T can be seen on the outer surface of the tank wall 9 by means of the indicator 48 which responds directly to the float 44 through the double pulley system. The housing 12 is of course kept sealed from the housing 14 and thus any gas buildup within the tank will not seep through. On the other hand, the cable 46 and pulley 28 can be kept open to the atmosphere and it is not necessary as in prior art structures to keep the housing 14 and cable 46 in a sealed pipe encasing system.

It is also contemplated to have conventional sensors adapted to read the rotation of shaft 30 in order to provide telemetric readout of the depth of the float 44. Likewise, the housing 14 can be discarded with. It is also contemplated that the diameter of pulley 28 can vary compared to the diameter of the pulley 26.

I claim:

1. A tank gauge comprising a first sealed housing sealingly mounted on the roof of a liquid containing, upstanding, cylindrical tank, the housing having parallel vertical walls including a first vertical planar wall, and aperture means communicating the first housing with the interior of the tank maintaining the interior volume of the tank and the first housing sealed from the atmosphere, a pulley shaft journaled in the vertical walls of the first housing and exteriorly through the first vertical planar wall, seal means engaging the pulley shaft at the first vertical planar wall, a second housing provided adjacent the first housing enclosing a portion of the pulley shaft extending exteriorly relative to the first housing and the first vertical planar wall being a common wall to the first and second housing, a first pulley fixedly mounted to the pulley shaft in the first housing and a second pulley fixedly mounted on the pulley shaft in the second housing, whereby the torque provided by either pulley is directly transmitted to the other pulley, a first suspension cable having a first end attached to the first pulley, said first suspension cable being wound on the first pulley and passing through the aperture means into the tank and a floating member having a predetermined weight and a buoyancy sufficient to float on the liquid in the tank provided at the other end of the first suspension cable in the tank, a second suspension cable having a first end attached to the second pulley, said second suspension cable being wound on the second pulley opposite to the winding on the first pulley and suspended exteriorly of the tank parallel to an outer surface of a tank wall, and a weight and indicator provided at the other end of the second cable, wherein the weight weighs less than the weight of the float but sufficient to act as a counterweight on the system and to maintain the first and second suspension cables taut wherein the tank has scale means which cooperate with said indicator to indicate the level of a liquid inside the tank.

2. A tank gauge as defined in claim 1, wherein said scale means are provided on the outer surface of the tank wall and the indicator is adapted to move vertically relative to the scale means on the tank wall.

* * * * *